United States Patent [19]
Barcock

[11] 3,915,343
[45] Oct. 28, 1975

[54] HOPPER HAVING MOVABLE PARTITIONS

[75] Inventor: Kenneth Barcock, Doncaster, England

[73] Assignee: International Harvester Company, Chicago, Ill.

[22] Filed: Oct. 18, 1973

[21] Appl. No.: 407,719

[52] U.S. Cl. ............... 222/129; 220/22.1; 222/564
[51] Int. Cl.² ..................... A01C 7/06; A01C 19/00
[58] Field of Search .......... 222/129, 134, 438, 564, 222/460, 462, 129, 464; 221/242; 220/22, 22.1, 22.2, 222.4; 105/247, 248

[56] References Cited
UNITED STATES PATENTS

| | | | |
|---|---|---|---|
| 486,919 | 11/1892 | Winget | 222/129 X |
| 964,245 | 7/1910 | Hadley | 222/129 X |
| 1,078,279 | 11/1913 | Hartbauer et al. | 222/129 X |
| 1,663,574 | 3/1928 | Venable | 222/129 X |
| 1,709,211 | 4/1929 | Graham | 222/129 X |
| 1,775,746 | 9/1930 | Yett | 222/134 X |
| 3,432,064 | 3/1969 | Ten Pas et al. | 220/22 |

*Primary Examiner*—Robert B. Reeves
*Assistant Examiner*—David A. Scherbel
*Attorney, Agent, or Firm*—F. David AuBuchon; Floyd B. Harman

[57] ABSTRACT

A hopper for a combined seed and fertilizer drill which has two separate compartments, one for the seed and one for the fertilizer. The hopper is divided into two compartments by a partition comprising juxtaposed members which can be removed from the hopper and remounted in the hopper in a different juxtaposed position to thereby vary the relative volumes of the two compartments.

2 Claims, 10 Drawing Figures

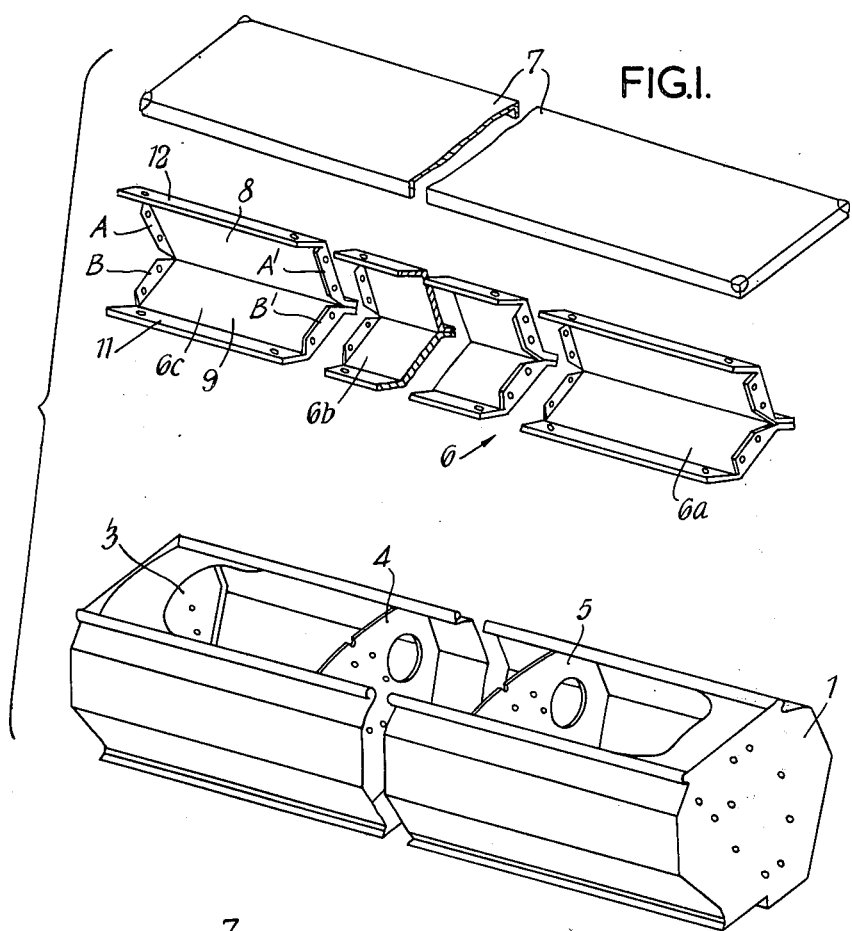
FIG.I.
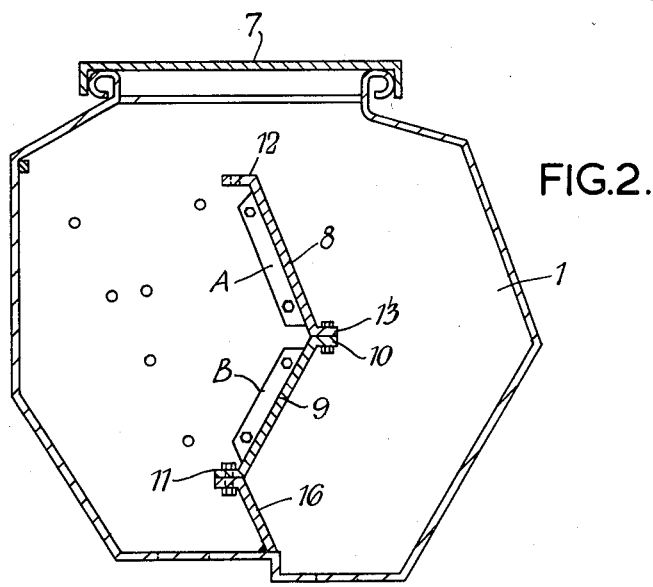
FIG.2.

HOPPER HAVING MOVABLE PARTITIONS

This invention relates to hoppers and in particular to the hoppers of combined seed and fertiliser drills which have two separate compartments, one for the seed and one for the fertiliser.

Combined seed and fertiliser drills are provided with separate outlets for the fertiliser and seed, each of which is associated with a respective meter for regulating the flow of seed or fertiliser from the hopper. Depending upon the season of the year, a smaller or larger quantity of fertiliser is distributed with the seed and consequently, it is desirable that the sizes of the two compartments in the hopper be variable so that the ratio of the quantities of grain and fertiliser carried by the hopper will always be such that the two compartments are emptied at approximately the same time.

The present invention provides a hopper which is divided into two chambers by a partition which comprises juxtaposed members which can be removed from the hopper and remounted in the hopper in a different juxtaposition in order to vary the relative volumes of the two compartments.

In one convenient construction, the partition comprises two panel members which are secured one above the other and are movable into the said different juxtaposition by changing the panel members between upper and lower positions without rotation of either panel member.

In an alternative construction, the two panel members are secured one above the other and are movable into the said different juxtaposition by rotating the panel members through 90°whilst retaining one panel member in an upper position and the other panel member in a lower position.

Preferably, the said members can be mounted in a further different juxtaposition in which the partition closes off one of the compartments in the hopper.

Whilst the hoppers of this invention are particularly suitable for use in combined seed and fertiliser drills, the hoppers can be used in any other application where it is desired to vary the relative volumes of two chambers in the hopper.

In order that the invention may be better understood, embodiments thereof will now be described by way of example only, with reference to the accompanying drawings, in which:

FIG. 1 is an "exploded" perspective view of a hopper for a combined seed and fertiliser drill in accordance with this invention;

FIG. 2 is a transverse cross-sectional view on an enlarged scale of the hopper of FIG. 1 with the lid and partition in place;

Figure 9:
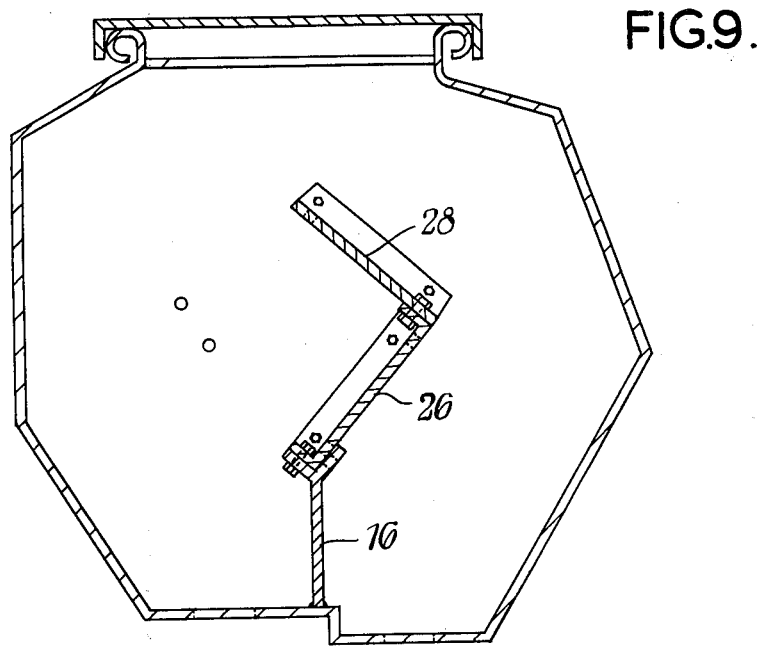
Figure 10:
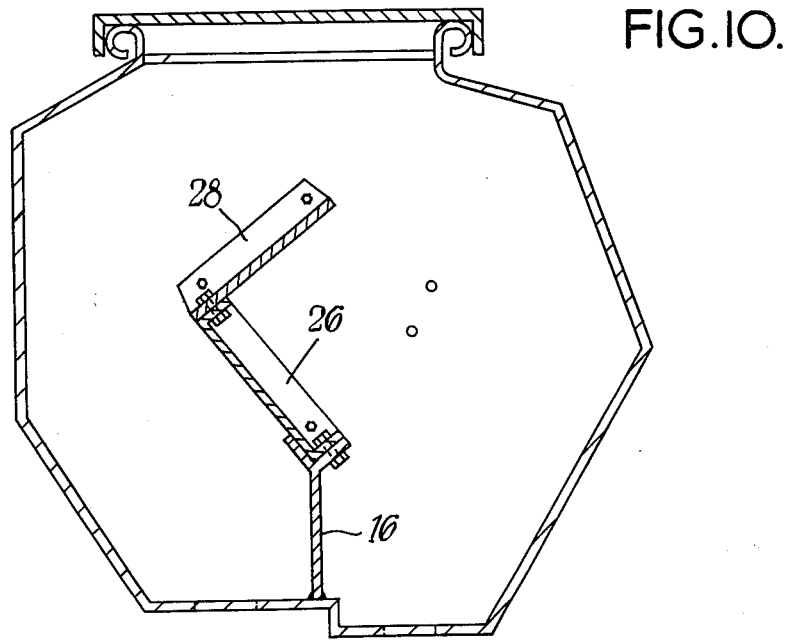

FIG. 9 is a view similar to FIG. 2 showing a still further construction for the partition, and FIG. 10 is a view similar to FIG. 9 showing the Referring to FIG. 1, there is shown a hopper 1 for a combined seed and fertiliser drill which includes two end walls 2 and 3 and two dividing walls 4 and 5 which divide the hopper transversely into three sections. These dividing walls prevent the material in the hopper from accumulating at one end of the hopper when, for example, the hopper is being used on a hillside. A partition 6, which is made in three sections 6a, 6b, 6c, extends longitudinally along the hopper and divides the hopper into two chambers, each of the chambers being subdivided into three sections by the dividing walls 4 and 5. Seed is placed in one of the chambers and fertiliser is placed in the other chamber. The hopper is closed by a lid 7.

Three outlets (not shown) are provided in the base of the hopper 1 on each side of the partition, one associated with each section of one of the chambers. All six outlets include conventional metering devices (not shown) which control the flow of grain or fertiliser from the hopper.

Figure 3:
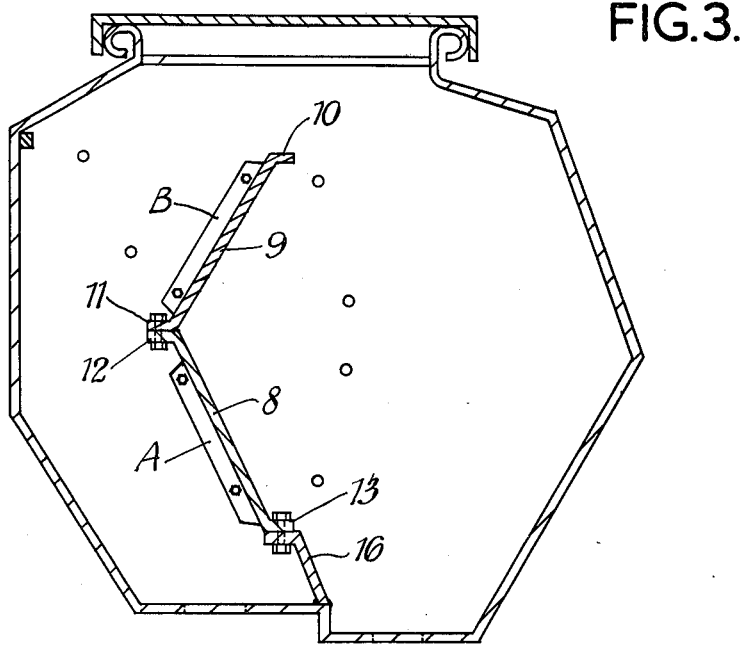
FIG. 3 is a view similar to FIG. 2 showing the partition in a different position.

One construction for the partition is shown in FIGS. 2 and 3 of the accompanying drawings. Each section of the partition includes two panel members 8 and 9 each of which is provided with two edge flanges 10, 11, 12 and 13, which extend in opposite directions from the panel member, and two end flanges A,A' and B,B'. The edge flanges 10, 11, 12 and 13 are provided with bolt holes which enable the two panel members 8 and 9 to be bolted together with the panel member 8 being secured above the panel member 9, as shown in FIG. 2. With the panel members 8 and 9 secured to each other in this way to constitute the partition, the partition can be fixed in the hopper by bolts which pass through the end flanges A,A' and B,B' of the panel members 8 and 9 and bolt holes in the end walls and dividing walls 2,3,4,5 of the hopper 1. The lower flange of the lower panel member 9 can also be bolted to a bracket 16 which projects up from the base of the hopper.

If it is desired to vary the relative volumes of the two compartments in the hopper, the two panel members can be unbolted, removed from the hopper and remounted in the hopper in a different juxtaposition, as illustrated in FIG. 3. In this arrangement, the panel member 8 which was originally located above the panel member 9 is now located below panel member 9 and it will be observed that the alteration of the juxtaposition of the two panel members does not involve rotation of either of the panel members 8 and 9.

Figure 4:
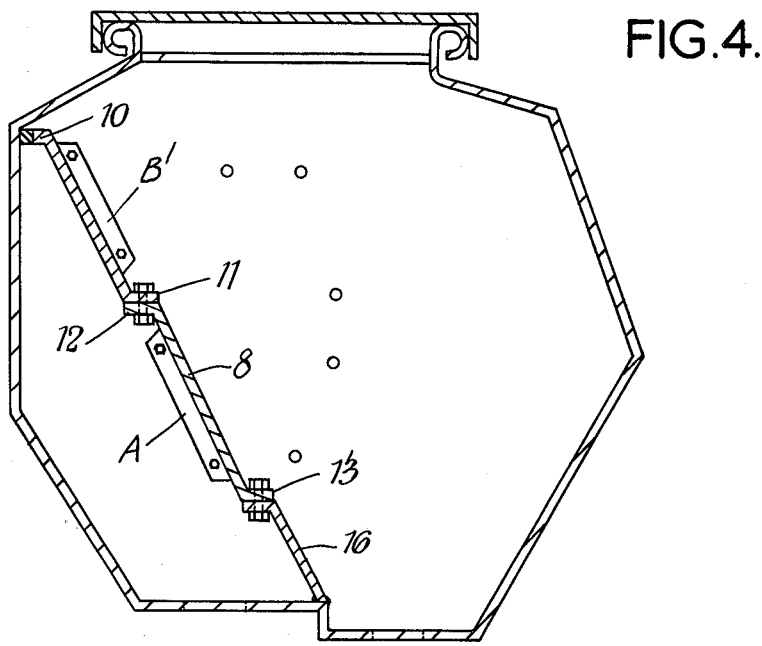
FIG. 4 is a view similar to FIG. 2 showing the partition in a further position.

It if is desired that the hopper should contain a single large chamber, the panel members 8 and 9 can be mounted in the hopper in a further different juxtaposition, as shown in FIG. 4. In this arrangement of the panel members 8 and 9, the lower panel member 8 is mounted in the bracket 16 in the position as shown in FIG. 3 and the upper panel member 9 is mounted on the lower panel member 8 and mates with a flange which is secured to one side of the internal surface of the hopper 1, the panel member 9 being rotated through 180° about a vertical axis from the position it occupied in FIG. 3. In this configuration, the compartment in the hopper to the left of the partition, as shown in FIG. 4, is closed off by the partition and the compartment to the right of the partition, as shown in FIG. 4, occupies the major part of the space within the hopper 1. With this arrangement, a large quantity of a single material, grain or fertiliser, can be carried within the hopper.

Figure 5:
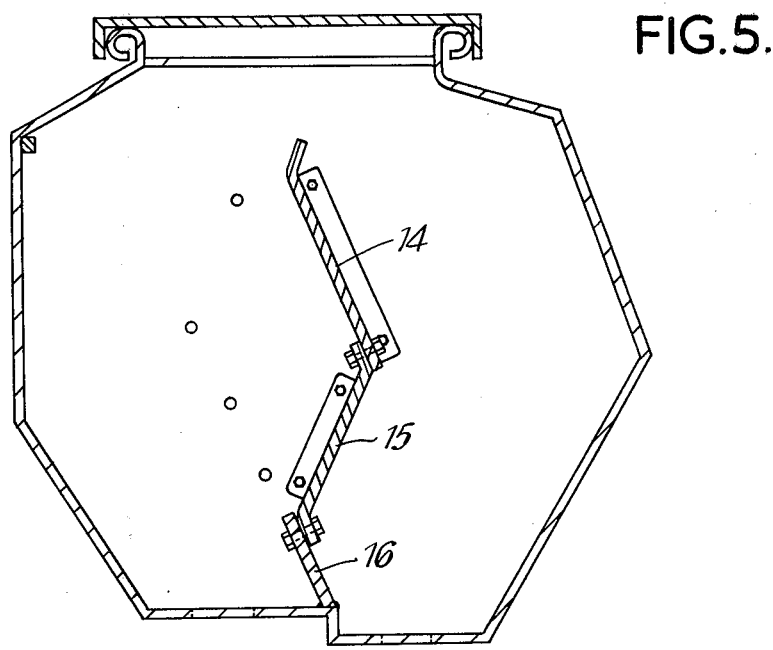
FIG. 5 is a view similar to FIG. 2 showing an alternative construction for the partition.
Figure 6:
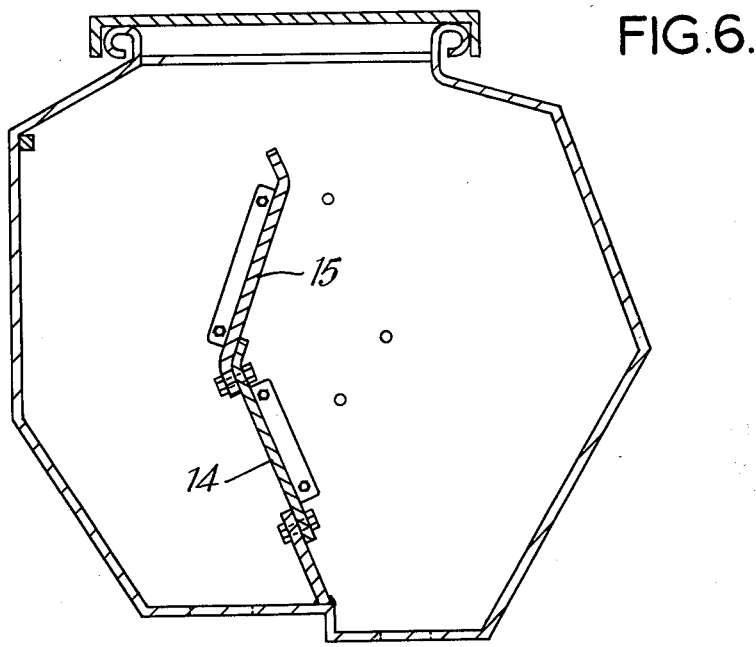
FIG. 6 is a view similar to FIG. 5 showing the partition in a different position.

FIGS. 5 and 6 illustrate an alternative construction for the partition in which the face of one panel member 14 is provided with bolt holes by which it is secured to one of the oppositely directed edge flanges of another panel member 15. The other edge flange on the panel member 15 is bolted to a bracket 16 on the base of the hopper 1. The panel members 14 and 15 are both provided with end flanges by which the panel members can be bolted to the end walls and dividing walls of the hopper.

In order to vary the relative volumes of the two compartments of the hopper, the panel members 14 and 15 are removed from the hopper and remounted in the hopper in a different juxtaposition, as shown in FIG. 6 with the panel 14 now located beneath the panel 15 and secured to the bracket 16. Again, the movement of the panel members between the two possible juxtapositions does not involve rotation of either panel member.

Figure 7:
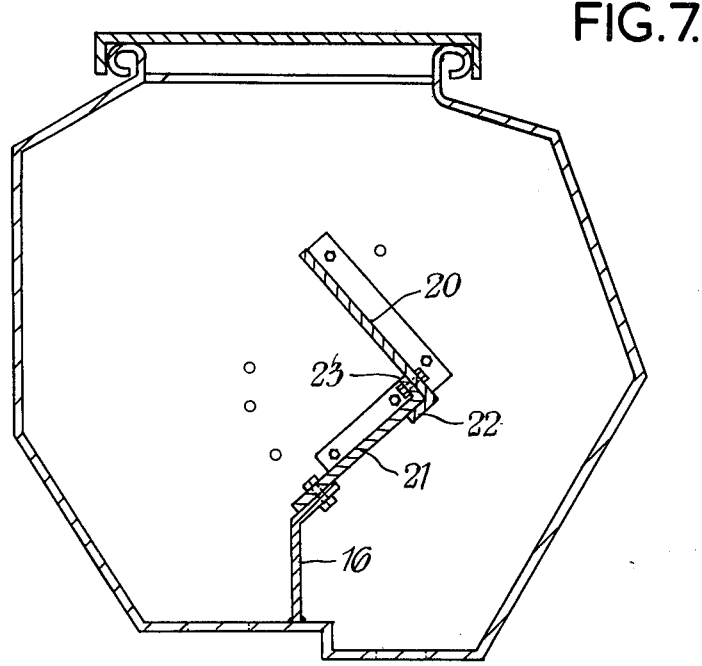
FIG. 7 is a view similar to FIG. 2 showing a further alternative construction for the partition.
Figure 8:
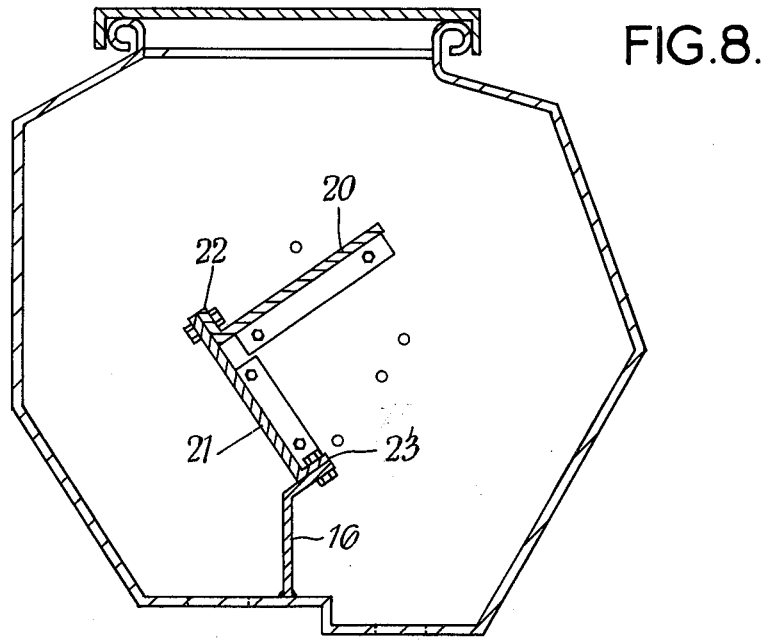
FIG. 8 is a view similar to FIG. 7 showing the partition in a different position.

FIGS. 7 and 8 show a further alternative construction for the partition which comprises two panel members 20 and 21, each of which has an edge flange 22 and 23. The panel members 20 and 21 can be secured to each other to constitute the partition, as shown in FIG. 7, by bolting the flange of the lower panel member 21 to the face of the upper panel member 20 immediately adjacent the flange 22. The face of the lower panel member 21 is also provided with a bolt hole by which the panel member 21 can be bolted to a bracket 16 mounted on the base of the hopper 1.

In order to vary the relative volumes of the two compartments of the hopper defined by the partition, the panel members 20 and 21 are unbolted from each other and from the bracket 24 and moved into a different juxtaposition by rotating each panel member through 90° in the same direction and reassembling the panel members in the configuration shown in FIG. 8. It will be observed that in both the juxtapositions of the panel members 20 and 21, the panel member 20 is located above the panel member 21.

FIGS. 9 and 10 illustrate a still further alternative construction for the partition. A lower panel member 26 is provided with two edge flanges which project in the same direction and which are provided with bolt holes by which the panel member is secured to a Y-shaped bracket 16 on the base of the hopper 1. A second panel member 28 is bolted to the upper flange of the panel member 26. Both panel members are provided with end flanges by which the panels are secured to the end walls and dividing walls of the hopper. If desired, the lower panel 26 could be retained in place only by its being secured to the end walls and dividing walls of the hopper 1 in which case, the bracket 16 would serve as a guide for the alignment of the partition. In order to vary the relative volumes of the two chambers in the hopper, the two panel members 28 and 26 are removed from the hopper and moved into a different juxtaposition by rotating each panel member through 90° in opposite directions and reassembling the panel members in the hopper as illustrated in FIG. 10. In both juxtapositions of the panel members illustrated in FIGS. 9 and 10, the panel member 26 is located beneath the panel member 28.

In all the embodiments of the invention described above with reference to the accompanying drawings, the partition is constituted by the two panel members each being made in these sections. If desired, however, each section of the partition could be constituted by three or more separate panel members.

What we claim is:

1. A hopper which is divided into two chambers by a partition which comprises juxtaposed members, each member including a pair of edge flanges, means for rigidly securing an edge flange of one member to either of the edge flanges of a juxtaposed member, such that said members can be removed from the hopper and remounted in the hopper in a different juxtaposition in order to vary the relative volumes of the two chambers.

2. A hopper according to claim 1 wherein said hopper and members are shaped such that they can be mounted in a further different juxtaposition in which the partition closes off the upper opening to one of the chambers in the hopper.

* * * * *